Figure 3:
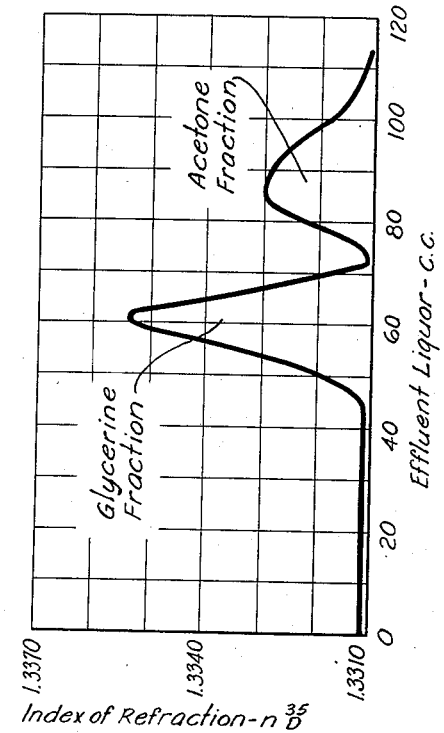

Nov. 3, 1959  R. M. WHEATON  2,911,362
SEPARATION OF WATER-SOLUBLE ORGANIC COMPOUNDS
Filed Nov. 24, 1952

INVENTOR.
Robert M. Wheaton
BY
Griswold & Burdick
ATTORNEYS

United States Patent Office 2,911,362
Patented Nov. 3, 1959

2,911,362
SEPARATION OF WATER-SOLUBLE ORGANIC COMPOUNDS

Robert M. Wheaton, Midland, Mich., assignor to The Dow Chemical Company, Midland, Mich., a corporation of Delaware Application November 24, 1952, Serial No. 322,254

10 Claims. (Cl. 210—31)

This invention concerns a method of separating, from one another, two or more water-soluble organic substances, which substances are non-ionized, or undergo little ionization in dilute aqueous solutions thereof. It relates more particularly to a method wherein an aqueous solution of two or more of such organic compounds is treated with a solid water-insoluble material which absorbs said compounds from the water after which the absorbed organic compounds are eluted from the solid material with water.

The invention is based on a discovery that when an ion exchange material such as a synthetic cation exchange resin or a synthetic anion exchange resin and an aqueous solution of a mixture of two or more water-soluble non-ionized or lowly ionized organic substances which are capable of being absorbed by the ion exchange material and have certain relationships to each other and to the ion exchange material as hereinafter brought out, are contacted with one another, the organic substances are selectively absorbed by the insoluble ion exchange material and are proportionately removed from the solution. The surrounding liquid is washed, drained, or flushed, from the ion exchange material, after which the absorbed organic substances are displaced from the ion exchange material by merely washing the ion exchange material with water. The displaced effluent liquor from the ion exchange material is collected as successive fractions, whereby there is obtained a fraction of the effluent liquid which contains a major proportion of the least extensively absorbed organic substance and subsequent fractions each containing a major proportion of a more difficultly displaceable organic substance, in the order in which they are selectively displaced from the ion exchange material by the eluting liquid. The water-soluble organic compounds are thereby separated from one another.

The method just described involves the separation of non-ionized or lowly ionized, water-soluble organic compounds from one another in an aqueous medium wherein a physical selective absorption of the organic compounds by the insoluble ion exchange material occurs and the absorbed organic compounds are selectively displaced from the ion exchange material inversely to the order in which they are absorbed by said material, merely by washing the ion exchange material with water.

The method constitutes a new type of chromatographic separation process employing ion exchange resins for separating two or more water-soluble organic compounds from one another in an aqueous medium without the occurrence of an ion exchange reaction, i. e. in the substantial absence of a chemical reaction involving an absorption of ions from the aqueous medium by the resin, or the introduction of ions into the solution from the resin.

The method of the invention is limited by requirements that the solution under treatment contain two or more water-soluble organic compounds which are non-reactive with the ion exchange resin, and that the ion exchange resin be capable of selectively absorbing the organic compounds.

It has been found that two or more water-soluble organic compounds can readily be separated from one another in an aqueous medium by a procedure which involves passing an aqueous solution of the organic compounds into contact with a water-immersed bed of an insoluble ion exchange resin in granular form, which resin is capable of selectively absorbing the organic compounds, eluting the resin with water and collecting the displaced effluent liquor as successive fractions of the effluent liquid, whereby there is obtained a fraction of the effluent liquor which contains a major proportion of the least readily absorbed organic compound and subsequent fractions containing a major proportion of an organic compound which is more readily absorbed by the ion exchange resin than a previously eluted organic solute, in the order in which said absorbed organic compounds are selectively displaced from the ion exchange resin by the eluting liquid. In most, if not all instances the individual water-soluble organic compounds are obtained as the sole or the principal solute in the successive fractions of the effluent liquid.

As hereinbefore indicated there are certain factors which limit the scope of the invention. All ion exchange resins, i. e. both cation and anion exchange resins, can be employed as the selective absorbent in the method of the invention, but it is necessary that the ion exchange resin be capable of selectively absorbing the non-ionized or lowly ionized water-soluble organic compounds which are present as solute in the aqueous solution and that the resin selectively release the absorbed compounds upon washing with water.

A considerable number and variety of ion exchange resins, both anionic and cationic, which may be employed in the process of the invention are known. Examples of suitable cation exchange resins are sulfonated phenol-formaldehyde resins, sulfonated copolymers of monovinyl aromatic hydrocarbons and polyvinyl aromatic hydrocarbons such as are disclosed in U.S. Patent No. 2,366,007 and carboxylated resins such as are disclosed in U.S. Patent No. 2,471,818.

The cation exchange resins may be employed either in their salt form, e.g. as the sodium salt thereof, or in their acidic form, i.e. their hydrogen form, the latter being preferred. The cation exchange resins which are usually employed are ones ionizable to an extent such that upon adding a 10 gram portion of the acidic form of such resin to 100 cc. of a 0.1-normal aqueous sodium chloride solution, a mixture having a pH value of 3 or lower is produced, and cation exchange resins containing sulfonate groups are preferred.

Examples of suitable anion exchange resins which may be employed in the process of the invention are the resinous condensation products of phenol, formaldehyde and alkylene polyamines which are disclosed in U.S. Patent No. 2,341,907; the resinous condensation products of phenol, alkylene polyamines and ammonia, or an ammonium salt, which are disclosed in U.S. Patent No. 2,546,938; resinous quaternary ammonium bases or salts such as the reaction product of a tertiary amine and an insoluble cross-linked copolymer of a monovinyl aromatic hydrocarbon and a divinyl aromatic hydrocarbon, which copolymer contains halomethyl groups on its aromatic nuclei, described in U.S. Patent No. 2,591,573; and the resinous reaction products of a primary amine or a secondary amine and such copolymers, described in U.S. Patent No. 2,591,574. The anion exchange resins may be employed in their salt form, or in their free amine or basic form. In most instances, a strongly basic anion exchange resin, e.g. one which when added as a 10 gram portion of the basic form thereof to 100 cc. of a 0.1-normal aqueous sodium chloride solution forms a mixture having a pH value of 11 or higher, is more effective than a weakly basic anion exchange resin for the purpose of the invention, and anion exchange resins containing quaternary ammonium radicals are preferred. Such anion exchange resins are usually employed in their salt form, e.g. as a resinous quaternary ammonium chloride.

It is necessary that the ion exchange resin be capable of selectively absorbing the organic compounds in the aqueous solution under treatment, and conversely stated, it is necessary that such solutes, i.e. two or more organic compounds, be capable of being selectively absorbed by the ion exchange resin in order to effect a separation of the organic compounds from one another in an aqueous medium by the method herein described.

The ion exchange resins appear to be readily absorptive of most non-ionized or lowly ionized water-soluble organic compounds which are of molecular sizes small enough to enter the interstices of the resins, but they do not readily, rapidly, or effectively, absorb compounds of larger molecular sizes. In most if not all instances, the ion exchange resins readily absorb water-soluble organic compounds of quite small molecular sizes such as lower monohydric alcohols, polyhydric alcohols, ether-alcohols, ketones, aldehydes, acids, phenols, or amines, from aqueous solutions thereof, but few, if any of the ion exchange resins absorb sucrose from an aqueous sucrose solution, apparently because the sucrose molecules are too large to enter the interstices of the resins, or enter and leave such interstices at a rate too slow to permit the method to be employed for the separation of sugars, e.g. the separation of sucrose from d-glucose. However, such sugar, e.g. d-glucose, can readily be separated from one or more other water-soluble organic compounds in an aqueous medium by the method of the invention, which other organic solute is selectively absorbed by the ion exchange resin to a greater degree than is the sugar.

Among the water-soluble non-ionized or lowly ionized organic compounds which can be separated from one another in an aqueous medium by the method herein described are lower monohydric alcohols, polyhydric alcohols, ether-alcohols, aldehydes, ketones, acids, phenols, or amines. In general, separation of two or more of such organic compounds from one another in an aqueous medium is accomplished more readily when the organic compounds are members of different classes, e.g. an alcohol and an aldehyde, then when the organic compounds are members of the same class. It may be mentioned that the separation of two or more water-soluble organic compounds from one another by the method of the invention is dependent upon a number of variables each of which is co-related and has an effect on the overall result. Among the variables which have been found to produce a considerable effect on the separation of two or more water-soluble organic compounds from one another in the process are: the particle size and type of the ion exchange resin employed, i.e. whether the resin is a cation or anion exchange resin, whether it is in its acidic, basic, or salt form, and whether it is in the form of coarse or fine granules; the selectivity of the ion exchange resin for absorbing the organic compounds; the concentration of the organic compounds, or solute, in the feed solution and the volume of said solution which is fed to a bed of the ion exchange resin; and the permeability of the ion exchange resin with respect to the solute.

Although the manner in which the ion exchange resins absorb the organic compounds is not clearly understood, it appears that since the ion exchange resins are permeable and swell when wet with, or immersed in water, and frequently absorb within the resin granules an amount of water equal to, or greater than, the weight of the resin, any solute such as a non-ionized or lowly ionized organic compound which is capable of entering and leaving the interstices of the ion exchange resin and which solute is non-reactive with said resin is also absorbed by the resin. The concentration of such solute in the water that is absorbed in the resin relative to the concentration of the solute in the water surrounding the resin at equilibrium conditions is represented by the equation:

$$Ci = KC_0$$

wherein the symbol $Ci$ represents the concentration of the organic solute in percent by weight of the aqueous solution inside of the ion exchange resin, $C_0$ is the concentration of the organic solute in percent by weight in the solution surrounding the ion exchange resin, and $K$ is a constant, herein defined as the "distribution constant." The distribution constant is the ratio of the concentration of the organic solute in the aqueous solution absorbed by the ion exchange resin to the concentration of said solute in the aqueous solution surrounding the ion exchange resin under equilibrium conditions. The distribution constant, or $K$, value for an aqueous solution of an organic compound and an ion exchange resin is a measure of the solute distribution and the degree to which an organic compound is absorbed by an ion exchange resin. The distribution constant value is conveniently determined by immersing a weighed portion of a dry ion exchange resin in granular form in water to swell the resin, then draining or filtering off the excess water and reweighing the resin. The gain in weight is the weight of water absorbed in the resin. The amount of water that is absorbed on outer surfaces of the resin is negligible and for purpose of the test may be disregarded. A portion of the wet ion exchange resin containing a known quantity, e.g. 50 cc., of water absorbed in the resin is treated with an aqueous solution of an equal amount of water containing a known low concentration, suitably 5 percent by weight, or less, of an organic compound as solute. The mixture is allowed to come to equilibrium. Thereafter, the concentration of the solute in the solution is determined in usual ways such as by index of refraction, or density, measurements. The concentration of the solute in the treated solution is substituted for the symbol $C_0$ in the above equation. The difference between the initial concentration of the solute in the solution and the concentration in the solution after treatment with the ion exchange resin is substituted for the symbol $Ci$ in the above equation. The ratio of the concentration of the solute in the liquid inside of the resin to the concentration of the solute in the surrounding liquid, i.e. $Ci$ to $C_0$, is the distribution constant, or $K$, value for the aqueous solution of the organic solute. If the values of the distribution constants as determined individually for any two or more water-soluble organic compounds, employing a particular ion exchange resin, differ from one another, the resin is selectively absorptive of the individual organic compounds and is capable of effecting separation of the said compounds from one another in an aqueous solution. Stated conversely, the organic compounds are selectively absorbed by the ion exchange resin and are capable of being separated from one another by the method of the invention.

The distribution constant, or $K$, value for an aqueous solution of an organic compound is a measure of the solute distribution and the degree to which an organic solute is absorbed by an ion exchange resin. A determination of the distribution constant values for aqueous solutions of individual organic compounds and a comparison of the $K$ values with one another provides a convenient way of predetermining: (a) the solute distribution; (b) the degree to which a water-soluble organic compound is absorbed by an ion exchange resin; (c) the manner in which any two or more water-soluble organic compounds can be separated from one another, i.e. whether readily, or with difficulty, and; (d) the order in which the absorbed organic compounds are displaced from the ion exchange resin when washed with water.

The greater the distribution constant or $K$ value, as determined for aqueous solutions of individual organic compounds of similar concentration employing a particular ion exchange resin, the more readily is the organic compound absorbed by the resin. Stated conversely, the greater, numerically, the distribution constant value, the more difficult is the absorbed organic compound to displace from the resin. The greater the K values differ from one another, numerically, the more readily are the organic compounds separated from one another in an aqueous solution. Stated conversely, the closer to one another, numerically, the K values, the more difficult it becomes to separate the organic compounds from one another. The absorbed organic compounds are eluted or displaced from an ion exchange resin inversely to the degree of absorption of the individual compounds by the resin. The organic compound least readily absorbed, i.e. having the smallest numerical K value, is first to be displaced from the resin, followed by other organic compounds in the order of the increasing numerical K values. The organic compound most readily absorbed, i.e. having the greatest numerical K value, is the last to be displaced from the resin by the eluting fluid, e.g. water.

It will be evident to those skilled in the art that the ion exchange resin whether cation or anion, and whether employed in its acidic, basic, or salt form, should be non-reactive with the solute, i.e. the non-ionized or lowly-ionized organic compounds to be separated from one another in an aqueous medium. Stated conversely, the organic solute, or solutes, should be non-reactive with the ion exchange resin. In this connection, it is pointed out that a cation exchange resin in its hydrogen, i.e. its acidic, form, would not be operable to separate two or more amines, e.g. methylamine, or butylamine, from one another in an aqueous medium. Also, a strongly basic anion exchange resin containing quaternary ammonium groups should not be employed in its basic, or hydroxide, form to treat aqueous solutions of the organic compounds containing acids, or aldehydes, more specifically, acetic acid, propionic acid, butyric acid, etc., or formaldehyde, or acetaldehyde, since the acids chemically react with the hydroxide form of the anion exchange resin, i.e. a resinous quaternary ammonium base, and the aldehydes are caused to react or condense, alone, or with one another, to form aldehyde resins.

The process is usually carried out at temperatures of from 0° to 95° C., and in liquid phase, i.e. at temperatures below the boiling point of the solute, or such that the organic compounds remain dissolved in the aqueous medium. The process is conveniently carried out at room temperature or thereabout.

In practice an aqueous solution of at least two non-ionized or lowly ionized organic compounds is fed into contact with a water-immersed bed of a suitable ion exchange resin, i.e. an ion exchange resin in a form which is non-reactive with the organic compounds or solute, and which resin is capable of selectively absorbing the organic compounds. The aqueous solution under treatment is usually fed to the bed in amount not exceeding the amount of the water absorbed in the resin, preferably in amount corresponding to from 10 to 25 percent by volume of the water absorbed in the resin, with resultant displacement from the bed of an equal volume of water. Water is introduced to flush the liquor and the absorbed material from the resin. The water is usually added slowly to the resin since the degree of separation is dependent in part upon the rate of elution of the absorbed organic compounds from the ion exchange resin. The effluent liquid is collected as successive fractions of the displaced liquor whereby there is obtained a fraction of the effluent liquor which contains a major proportion of the least extensively absorbed organic compound and subsequent fractions each containing a major proportion of a more difficultly displaceable absorbed organic compound in the order in which they are selectively displaced from the ion exchange resin by the eluting liquid. In most instances the individual organic compounds are obtained as the sole or the principal solute in the successive fractions of the effluent liquid, whereby the organic compounds are separated from one another. Recovery of an individual organic compound from, or concentration of a fraction of, the effluent liquor may be accomplished in usual ways, e.g. by evaporation of the water, or by distillation of the organic compound from the water.

During passage of the aqueous liquids, i.e. the starting solution and subsequently of water, through the bed of the ion exchange resin there are collected, as successive fractions of the effluent liquid: (a) water flushed from the bed of the ion exchange resin; (b) a fraction rich in the organic compound that is least readily absorbed by the ion exchange resin; (c) usually, an intermediate aqueous fraction containing little, if any, solute; (d) a fraction rich in an organic compound that is absorbed to a greater degree by the ion exchange resin than is the least readily absorbed organic solute which is first to be displaced; (e) an aqueous fraction containing little, if any, solute; and, if there is a third non-ionized organic solute in the starting solution, (f) a subsequent fraction rich in an organic compound that is absorbed by the ion exchange resin to a greater degree than any previously displaced organic solute, followed by an aqueous fraction containing little if any organic solute. The cycles of a fraction of the effluent liquor rich in an organic solute that is absorbed by the ion exchange resin to a greater degree than any previously displaced organic solute followed by an aqueous fraction containing little, if any, organic solute is continued until each of the absorbed organic compounds has been displaced from the ion exchange resin.

When in a given cycle of the above-mentioned operations, the volume of starting solution fed to the bed of the ion exchange resin is equal to or less than the volume of water initially absorbed in the resin, a major amount by weight of the least readily absorbed organic solute in the starting solution is obtained in the above fraction (b), the intermediate fraction (c) is usually water containing little, if any solute, the subsequent fraction (d) contains a major amount of an organic compound that is absorbed by the resin to a greater degree than is the organic solute in fraction (b), fraction (e) is usually water containing little, or no, organic solute, and fraction (f), if present, contains a major amount of an organic solute that is absorbed by the resin to a greater degree than is the organic solute in fraction (d), and is followed by a subsequent fraction of water containing little, if any, organic solute. Upon elution or displacement of all of the absorbed organic compounds from the bed of the ion exchange resin, the bed is in condition for feed thereto of a further amount of the starting solution, i.e. the foregoing cycle of operations is repeated.

When carrying out the abovementioned cycle of operations after feed of the starting solution and subsequently of water to the bed of an ion exchange resin to flush the solutes therefrom, the feed of the starting solution may be resumed before collection of the effluent fractions is completed. The amount of the feed water need not be sufficient, of itself, to flush all of the absorbed solutes from the ion exchange resin bed. It is merely necessary that the volume of the water be as large, or preferably larger, than the volume of water initially absorbed in the resin. When such amount of water is used, and feed of the starting solution is resumed before collection of the last of the fractions containing an organic solute, the water serves as a cushion between the inflowing feed solution and the outgoing liquor and forces the remainder of the absorbed organic solute from the bed of resin ahead of the inflowing solution.

The accompanying drawing illustrates graphically the changes in composition of successive fractions of the effluent liquor collected during a single cycle of operations in each of several experiments which were carried out. The drawing will be referred to in greater detail in examples, hereinafter presented, as to such experiments.

The above-described cycle of operations may be repeated many times, using the same bed of ion exchange resin and successive portions of a starting solution, to separate further amounts of the organic solutes in the starting solution from one another.

The method as just described, may be applied in treating an aqueous solution containing at least two of any of a wide variety of organic compounds each having an ionization constant not greater than $1.4 \times 10^{-3}$, as solute, which organic compounds are non-reactive with the ion exchange resin employed and are selectively absorbed by said ion exchange resin. The distribution constants or K values determined for aqueous solutions containing, respectively, 5 percent by weight or less, e.g. from 2 to 5 percent, of the individual organic compounds should differ from one another by at least 0.1 in order to readily effect a separation of a mixture of two or more of the organic compounds into the individual components in an aqueous medium by the method of the invention. The greater the numerical difference of the distribution constant values from one another, the easier are the organic compounds separated from one another under otherwise similar conditions. Also, the greater numerically the K value for an organic compound, the more readily is the compound absorbed by the ion exchange resin. Below are listed the distribution constants or K values determined for a number of water-soluble non-ionized or lowly ionized organic compounds employing an aqueous solution containing 5 percent by weight of an individual organic compound as solute, together with the ion exchange resin used. The ion exchange resins employed in determining the distribution constant values for the organic compounds were in the form of rounded granules. The cation exchange resin was a sulfonated copolymer of approximately 87 percent by weight styrene, 5 percent ethylvinylbenzene and 8 percent divinylbenzene. The resin was in its hydrogen form and had a cation exchange capacity of 5 milliequivalents per gram of the dry resin. The anion exchange resin (A) was the reaction product of trimethylamine and a chloromethylated copolymer of approximately 88.5 percent styrene, 4 percent ethylvinylbenzene and 7.5 percent divinylbenzene. It was a resinous quaternary ammonium chloride, i.e. the anion exchange resin was in its chloride form. The anion exchange resin (B) was the reaction product of dimethylethanolamine and a chloromethylated copolymer of approximately 88.5 percent styrene, 4 percent ethylvinylbenzene and 7.5 percent divinylbenzene. It was an insoluble resinous quaternary ammonium base. Each solution is identified by naming the organic compound contained therein. The ion exchange resin used and the K value determined for each organic compound are also given.

| Solution No. | Solute | Ion Exchange Resin | K |
|---|---|---|---|
| 1 | d-Glucose | H-form of a Sulfonated Styrene-Divinylbenzene Copolymer. | 0.21 |
| 2 | Sucrose | ____do____ | 0.23 |
| 3 | Glycerine | ____do____ | 0.47 |
| 4 | Methanol | ____do____ | 0.57 |
| 5 | Formaldehyde | ____do____ | 0.58 |
| 6 | Ethylene Glycol | ____do____ | 0.59 |
| 7 | Acetic Acid | ____do____ | 0.68 |
| 8 | Tri Ethylene Glycol | ____do____ | 0.71 |
| 9 | Acetone | ____do____ | 1.14 |
| 10 | Phenol | ____do____ | 3.00 |
| 11 | Methylamine | Anion Exchange Resin (A) Quaternary Ammonium Chloride. | 0.08 |
| 12 | Methanol | ____do____ | 0.57 |
| 13 | Acetone | ____do____ | 0.95 |
| 14 | Formaldehyde | ____do____ | 0.97 |
| 15 | n-Butylamine | ____do____ | 0.98 |
| 16 | Glycerine | ____do____ | 1.07 |
| 17 | Phenol | ____do____ | 16.88 |
| 18 | Methylamine | Anion Exchange Resin (B) Quaternary Ammonium Hydroxide. | 0.15 |
| 19 | Diethylene triamine | ____do____ | 0.19 |
| 20 | Methanol | ____do____ | 0.33 |
| 21 | Acetone | ____do____ | 0.48 |

The following examples illustrate certain ways in which the principle of the invention has been applied, but are not to be construed as limiting the invention.

EXAMPLE 1

A glass tube of approximately 0.5 inch internal diameter was filled to a depth of about 24 inches with 100 cubic centimeters of a water-wet and swollen granular cation exchange resin (Dowex 50) in hydrogen form, which resin was a sulfonated copolymer of approximately 87 percent styrene, 5 percent ethylvinylbenzene and 8 percent divinylbenzene. The ion exchange resin in its dry form was composed of rounded granules of from 50 to 100 mesh per inch size as measured with standard Tyler screens. The tube was filled with water to the top level of the wet resin bed. The resin bed contained approximately 30 cc. of water outside of, or surrounding, the resin granules, 42 cc. of water absorbed in the resin and 28 cc. of the resin granules (dry basis). Fifteen cubic centimeters of an aqueous solution containing 4 percent by weight of d-glucose and 4 percent by weight of acetone was fed to the tube with resultant displacement from the tube of an equal volume of water. After feeding the 15 cc. of solution to the bed of the resin, water was introduced at a rate of 1 cc. per minute to flush the liquor and absorbed material from the bed. The effluent liquor was collected in successive fractions and each fraction was tested to determine its index of refraction. The index of refraction constitutes an indirect, but easily determined, measure of the concentration of solute in the respective fractions. Table I identifies the fractions as being stated portions of the effluent liquor and gives the index of refraction of each.

Table I

| Fraction | | $n_D^{35}$ |
|---|---|---|
| No. | cc. of Effluent Liquor | |
| 1 | 0–28 | 1.3311 |
| 2 | 28–32 | 1.3311 |
| 3 | 32–36 | 1.3320 |
| 4 | 36–40 | 1.3347 |
| 5 | 40–44 | 1.3362 |
| 6 | 44–48 | 1.3365 |
| 7 | 48–52 | 1.3343 |
| 8 | 52–56 | 1.3315 |
| 9 | 56–60 | 1.3311 |
| 10 | 60–72 | 1.3311 |
| 11 | 72–76 | 1.3318 |
| 12 | 76–80 | 1.3327 |
| 13 | 80–84 | 1.3332 |
| 14 | 84–88 | 1.3332 |
| 15 | 88–92 | 1.3329 |
| 16 | 92–96 | 1.3321 |
| 17 | 96–100 | 1.3318 |
| 18 | 100–104 | 1.3313 |
| 19 | 104–108 | 1.3311 |
| 20 | 108–112 | 1.3311 |

Figure 1:
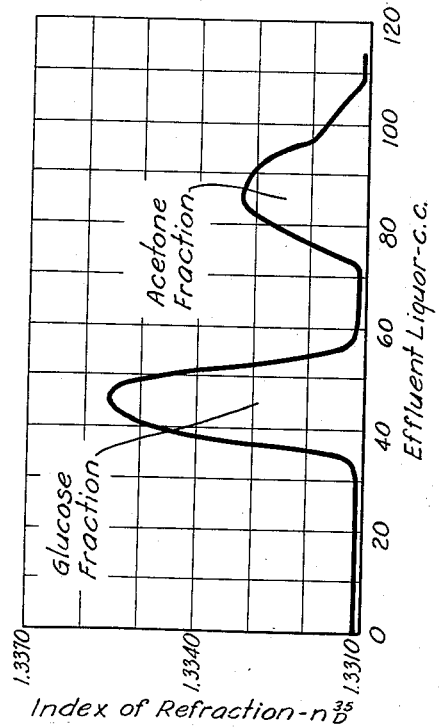

Fig. 1 of the drawing is a graph based on the data in Table I. From the experiment just described it will be seen that a complete separation of the d-glucose and the acetone from one another was effected. The individual components were obtained in greater dilution than in the initial or feed solution. Fractions Nos. 1 and 2, i.e. the effluent liquor from 0–32 cc., was water. Fractions Nos. 3–8 contained all of the d-glucose, followed by fractions Nos. 9–10 which were water containing no solute. Fractions Nos. 11–18 contained all of the acetone. The effluent liquor above 108 cc., i.e., fractions Nos. 19–20 were water. The resin bed was in condition for treatment with another portion of the feed solution.

EXAMPLE 2

Five cubic centimeters of an aqueous solution containing 5 percent by weight of sucrose, 5 percent of glycerine, 5 percent of triethylene glycol and 5 percent of phenol, was fed to the bed of the water-immersed ion exchange resin described in Example 1. After feeding the 5 cc. of the aqueous solution of the organic compounds to the bed of the resin, water was introduced at a rate of approximately 1 cc. per minute to flush the liquor and the absorbed material from the bed. The effluent liquor which was displaced by feed of the solution and subsequently of water to the bed, was collected as successive fractions. Each fraction was tested to determine its index of refraction. Table II identifies the fractions as being stated portions of the effluent liquor and gives the index of refraction of each.

Table II

| Fraction | | |
|---|---|---|
| No. | cc. of Effluent Liquor | $n_D^{35}$ |
| 1 | 0-34 | 1.3311 |
| 2 | 34-36 | 1.3312 |
| 3 | 36-38 | 1.3322 |
| 4 | 38-40 | 1.3349 |
| 5 | 40-42 | 1.3361 |
| 6 | 42-44 | 1.3350 |
| 7 | 44-46 | 1.3332 |
| 8 | 46-48 | 1.3321 |
| 9 | 48-50 | 1.3314 |
| 10 | 50-52 | 1.3311 |
| 11 | 52-56 | 1.3311 |
| 12 | 56-58 | 1.3319 |
| 13 | 58-60 | 1.3340 |
| 14 | 60-62 | 1.3352 |
| 15 | 62-64 | 1.3341 |
| 16 | 64-68 | 1.3326 |
| 17 | 68-70 | 1.3318 |
| 18 | 70-72 | 1.3328 |
| 19 | 72-74 | 1.3342 |
| 20 | 74-76 | 1.3337 |
| 21 | 76-78 | 1.3329 |
| 22 | 78-80 | 1.3321 |
| 23 | 80-82 | 1.3317 |
| 24 | 82-84 | 1.3312 |
| 25 | 84-86 | 1.3311 |
| 26 | 86-172 | 1.3311 |
| 27 | 172-174 | 1.3312 |
| 28 | 174-176 | 1.3317 |
| 29 | 176-178 | 1.3321 |
| 30 | 178-180 | 1.3324 |
| 31 | 180-182 | 1.3326 |
| 32 | 182-184 | 1.3326 |
| 33 | 184-186 | 1.3325 |
| 34 | 186-188 | 1.3324 |
| 35 | 188-190 | 1.3322 |
| 36 | 190-192 | 1.3321 |
| 37 | 192-194 | 1.3320 |
| 38 | 194-196 | 1.3320 |
| 39 | 196-198 | 1.3319 |
| 40 | 198-200 | 1.3319 |
| 41 | 200-202 | 1.3318 |
| 42 | 202-204 | 1.3318 |
| 43 | 204-206 | 1.3317 |
| 44 | 206-208 | 1.3317 |
| 45 | 208-210 | 1.3316 |
| 46 | 210-212 | 1.3315 |
| 47 | 212-214 | 1.3314 |
| 48 | 214-216 | 1.3313 |
| 49 | 216-218 | 1.3313 |
| 50 | 218-220 | 1.3312 |
| 51 | 220-222 | 1.3312 |
| 52 | 222-224 | 1.3312 |
| 53 | 224-226 | 1.3311 |
| 54 | 226-228 | 1.3311 |

Figure 2:
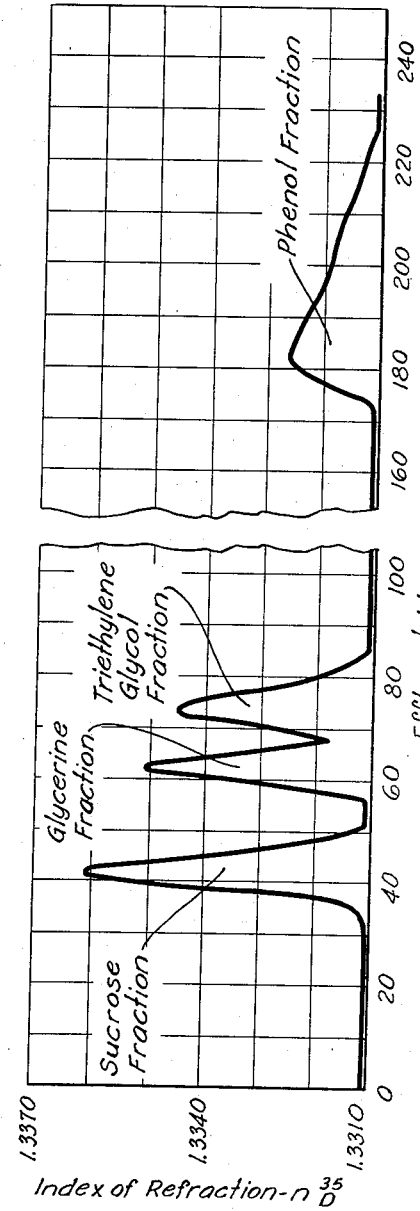

Fig. 2 of the drawing is a graph based on the data in Table II. The first of the above fractions was water. Fractions Nos. 2–9 contained all of the sucrose. Fractions Nos. 10–11 were water. Fractions Nos. 12–16 were rich in glycerine. Fraction No. 17 was principally water containing a very small amount of both glycerine and triethylene glycol. Fractions Nos. 18–24 contained approximately 95 percent of the triethylene glycol. Fractions Nos. 25–26 were water. Fractions Nos. 27–52 contained all of the phenol. Fractions Nos. 53–54 were water.

EXAMPLE 3

Fifteen cubic centimeters of an aqueous solution containing 4 percent by weight of acetic acid and 4 percent of acetone was fed to the bed of the water-immersed cation exchange resin described in Example 1, with resultant displacement from the tube of an equal volume of water. Water was introduced at a rate of approximately 1 cc. per minute to flush the liquid and the absorbed organic solute from the bed. The effluent liquor was collected in successive fractions. Each fraction was tested to determine its index of refraction. Table III identifies the fractions as being stated portions of the effluent liquor and gives the index of refraction of each.

Table III

| Fraction | | |
|---|---|---|
| No. | cc. of Effluent Liquor in Fraction | $n_D^{35}$ |
| 1 | 0-52 | 1.3311 |
| 2 | 52-56 | 1.3315 |
| 3 | 56-60 | 1.3331 |
| 4 | 60-62 | 1.3335 |
| 5 | 62-64 | 1.3340 |
| 6 | 64-66 | 1.3340 |
| 7 | 66-68 | 1.3339 |
| 8 | 68-72 | 1.3329 |
| 9 | 72-74 | 1.3322 |
| 10 | 74-76 | 1.3320 |
| 11 | 76-78 | 1.3316 |
| 12 | 78-80 | 1.3319 |
| 13 | 80-82 | 1.3323 |
| 14 | 82-84 | 1.3328 |
| 15 | 84-86 | 1.3329 |
| 16 | 86-88 | 1.3333 |
| 17 | 88-90 | 1.3329 |
| 18 | 90-92 | 1.3326 |
| 19 | 92-96 | 1.3322 |
| 20 | 96-100 | 1.3319 |
| 21 | 100-104 | 1.3315 |
| 22 | 104-108 | 1.3311 |

The first of the above fractions was water containing no solute. Fractions 2–10 contained substantially all of the acetic acid as solute. Fraction 11 contained very little of either solute, i.e., it was principally water. Fractions 12–21 was rich in acetone as the principal solute. Fraction 22 was water containing no solute. By plotting a graph of the volume of the effluent liquor versus the index of refraction of the individual fractions of said liquor one obtains an elution curve for the system.

EXAMPLE 4

Fifteen cubic centimeters of an aqueous solution containing 4 percent by weight of formaldehyde and 4 percent of acetone was fed to the bed of the water-immersed cation exchange resin described in Example 1. After feeding the solution to the bed of the resin, water was slowly introduced to flush the liquor and the absorbed organic compounds from the resin. The effluent liquor was collected in successive fractions and each fraction was tested to determine its index of refraction at 35° C. Table IV identifies the fractions as being stated portions of the effluent liquor and gives the index of refraction of each.

Table IV

| Fraction | | |
|---|---|---|
| No. | cc. of Effluent Liquor in Fraction | $n_D^{35}$ |
| 1 | 0-44 | 1.3311 |
| 2 | 44-48 | 1.3312 |
| 3 | 48-52 | 1.3325 |
| 4 | 52-56 | 1.3338 |
| 5 | 56-58 | 1.3351 |
| 6 | 58-60 | 1.3353 |
| 7 | 60-62 | 1.3352 |
| 8 | 62-64 | 1.3350 |
| 9 | 64-68 | 1.3333 |
| 10 | 68-72 | 1.3320 |
| 11 | 72-74 | 1.3315 |
| 12 | 74-76 | 1.3318 |
| 13 | 76-80 | 1.3325 |
| 14 | 80-84 | 1.3334 |
| 15 | 84-88 | 1.3330 |
| 16 | 88-92 | 1.3325 |
| 17 | 92-96 | 1.3321 |
| 18 | 96-100 | 1.3319 |
| 19 | 100-104 | 1.3316 |
| 20 | 104-108 | 1.3312 |
| 21 | 108-116 | 1.3311 |

The first of the above fractions was water containing no solute. Fractions 2–10 contained nearly all of the formaldehyde. Fraction 11 contained very little of either solute, i.e. it was nearly pure water. Fractions 12–20 contained substantially all of the acetone. Fraction 21 was water.

EXAMPLE 5

Fifteen cubic centimeters of an aqueous solution containing 4 percent by weight of glycerine and 4 percent of acetone was fed to the bed of the water-immersed cation exchange resin described in Example 1, after which the bed was eluted with water by procedure similar to that described in said example, to flush the water and the absorbed organic solutes from the resin. The effluent liquor was collected in successive fractions and the index of refraction of each portion of the effluent liquor at 35° C. determined. Table V identifies the fractions as being stated portions of the effluent liquor and gives the index of refraction of each.

*Table V*

| Fraction | | $n_D^{35}$ |
|---|---|---|
| No. | cc. of Effluent Liquor in Fraction | |
| 1 | 0–44 | 1.3311 |
| 2 | 44–48 | 1.3315 |
| 3 | 48–52 | 1.3327 |
| 4 | 52–56 | 1.3336 |
| 5 | 56–60 | 1.3353 |
| 6 | 60–64 | 1.3348 |
| 7 | 64–68 | 1.3324 |
| 8 | 68–72 | 1.3311 |
| 9 | 72–76 | 1.3313 |
| 10 | 76–80 | 1.3323 |
| 11 | 80–84 | 1.3330 |
| 12 | 84–88 | 1.3330 |
| 13 | 88–92 | 1.3328 |
| 14 | 92–96 | 1.3322 |
| 15 | 96–100 | 1.3318 |
| 16 | 100–104 | 1.3314 |
| 17 | 104–108 | 1.3312 |
| 18 | 108–112 | 1.3311 |

Fig. 3 of the drawing is a graph based on the data in Table V. The first of the above fractions was water. Fractions Nos. 2–7 container all of the glycerine. Fraction No. 8 was water. Fractions Nos. 9–17 contained all of the acetone. Fraction 18 was water.

EXAMPLE 6

A glass tube of approximately 0.5 internal diameter was filled to a depth of about 24 inches with 100 cubic centimeters of a water-wet and swollen granular action exchange resin in its hydrogen form, which resin was a sulfonated copolymer of approximately 93 percent styrene, 3 percent ethylvinylbenzene and 4 percent divinylbenzene. The cation exchange resin in its dry form was composed of rounded granules of from 20 to 50 mesh per inch, Tyler screen. The distribution constant or K value determined for an aqueous solution containing 5 percent by weight of methyl alcohol and the ion exchange resin was 1.09. the K value determined for an aqueous 5 weight percent solution of d-glucose was 0.60. The tube was filled with water to the top level of the resin bed. The bed contained approximately 30 cc. of water surrounding the resin, 47 cc. of water absorbed in the resin and 23 cc. of the resin granules (dry basis). Fifteen cubic centimeters of an aqueous solution containing 4 percent by weight of d-glucose and 4 percent of methyl alcohol was fed to the tube with resultant displacement from the tube of an equal volume of water. After feeding the 15 cc. of solution to the bed of the resin, water was introduced at a rate of 2 cc. per minute to flush the liquor and the absorbed material from the resin. The effluent liquor was collected in successive fractions and each fraction tested to determine its index of refraction. Table VI identifies the fractions as being stated portions of the effluent liquor and gives the index of refraction of each.

*Table VI*

| Fraction | | $n_D^{30}$ |
|---|---|---|
| No. | cc. of Effluent Liquor in Fraction | |
| 1 | 0–44 | 1.3321 |
| 2 | 44–48 | 1.3326 |
| 3 | 48–52 | 1.3339 |
| 4 | 52–56 | 1.3353 |
| 5 | 56–60 | 1.3367 |
| 6 | 60–64 | 1.3367 |
| 7 | 64–68 | 1.3355 |
| 8 | 68–72 | 1.3347 |
| 9 | 72–76 | 1.3328 |
| 10 | 76–84 | 1.3321 |
| 11 | 84–88 | 1.3322 |
| 12 | 88–92 | 1.3328 |
| 13 | 92–96 | 1.3329 |
| 14 | 96–100 | 1.3330 |
| 15 | 100–104 | 1.3327 |
| 16 | 104–108 | 1.3323 |
| 17 | 108–116 | 1.3321 |

The first of the above fractions was water containing no solute. Fractions 1–9 contained all of the d-glucose. Fraction 10 was water. Fractions 11–16 contained all of the methyl alcohol. Fraction 17 was water containing no solute.

EXAMPLE 7

A glass tube of approximately 0.5 inch internal diameter was filled to a depth of 24 inches with a granular quaternary ammonium anion exchange resin, which resin was the reaction product of a chloromethylated copolymer of approximately 88.5 percent by weight of styrene, 4 percent of ethylvinylbenzene and 7.5 percent of divinylbenzene, and trimethylamine. The anion exchange resin was in the form of rounded granules such as to pass through a 50 mesh per inch standard Tyler screen and be retained on a 100 mesh screen. The bed of the anion exchange resin was treated with a dilute aqueous solution of sodium hydroxide to convert the resin to its basic or hydroxide form and was washed with distilled water. The anion exchange resin contained an aromatic nuclei of the copolymer substituent radicals having the formula

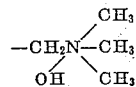

The tube was filled with water to the top level of the resin bed, after which 5 cc. of an aqueous solution containing 5 percent by weight of diethylenetriamine and 5 percent of acetone was fed to the tube with resultant displacement from the tube of an equal volume of water. After feeding the 5 cc. of solution to the bed of the anion exchange resin, water was slowly introduced to flush the liquor and the absorbed material from the bed. The effluent liquor was collected in successive fractions each of 2 cc. volume. Every other fraction of the effluent liquor was tested to determine the index of refraction. Table VII identifies the fractions as being stated portions of the effluent liquor and gives the index of refraction of each.

Table VII

| Fraction No. | cc. of Effluent Liquor in Fraction | $n_D^{35}$ |
|---|---|---|
| 1 | 0-36 | 1.3312 |
| 2 | 36-38 | |
| 3 | 38-40 | 1.3319 |
| 4 | 40-42 | |
| 5 | 42-44 | 1.3339 |
| 6 | 44-46 | |
| 7 | 46-48 | 1.3358 |
| 8 | 48-50 | |
| 9 | 50-52 | 1.3353 |
| 10 | 52-54 | |
| 11 | 54-56 | 1.3344 |
| 12 | 56-58 | |
| 13 | 58-60 | 1.3335 |
| 14 | 60-62 | |
| 15 | 62-64 | 1.3330 |
| 16 | 64-66 | |
| 17 | 66-68 | 1.3328 |
| 18 | 68-70 | |
| 19 | 70-72 | 1.3327 |
| 20 | 72-74 | |
| 21 | 74-76 | 1.3326 |
| 22 | 76-78 | |
| 23 | 78-80 | 1.3324 |
| 24 | 80-82 | |
| 25 | 82-84 | 1.3322 |
| 26 | 84-86 | |
| 27 | 86-88 | 1.3321 |
| 28 | 88-90 | |
| 29 | 90-92 | 1.3319 |
| 30 | 92-94 | |
| 31 | 94-96 | 1.3317 |
| 32 | 96-98 | |
| 33 | 98-100 | 1.3316 |
| 34 | 100-102 | |
| 35 | 102-104 | 1.3314 |
| 36 | 104-106 | |
| 37 | 106-108 | 1.3312 |
| 38 | 108-110 | |
| 39 | 110-112 | 1.3312 |

In the above experiment only every other fraction of the effluent liquor was analyzed for solute by determining the index of refraction. A 1 cc. portion of each of the effluent liquor fractions Nos. 1, 3, 5, 7, 9, 11, 13 and 15 was analyzed by titrating the same with an aqueous 0.1 normal aqueous hydrochloric acid solution to a pH value of 4. Table VII(a) identifies each fraction by number and gives the cubic centimeters of 0.1 normal hydrochloric acid solution required to bring an aqueous solution containing 1 cc. of the effluent liquor to a pH value of 4. The even numbered fractions of the effluent liquor were assumed to contain the solute in concentration between that of the adjacent odd numbered fractions.

Table VII(a)
EFFLUENT LIQUOR

| Fraction No. | cc. of $\frac{N}{10}$ HCl |
|---|---|
| 1 | 0 |
| 3 | 0.6 |
| 5 | 5.1 |
| 7 | 3.5 |
| 9 | 1.5 |
| 11 | 0.6 |
| 13 | 0.2 |
| 15 | 0 |

In the tables fraction No. 1 was water. Fractions Nos. 3-13 contained all of the diethylenetriamine. Fractions Nos. 15-35 were rich in acetone. Fractions Nos. 37-39 were water.

EXAMPLE 8

Amberlite IRC-50 (a weakly acidic carboxylic acid type cation exchanger) in its sodium form was ground and screened. A portion of the granular resin of a size such as to pass through a 50 mesh per inch standard Tyler screen and be retained on a 100 mesh screen was placed in a 100 cc. burette to form a bed of the resin 62 centimeters deep. The K value determined for an aqueous solution containing 5 percent by weight of acetone employing the cation exchange resin in its sodium form was 0.41. The K value determined for an aqueuos 5 percent solution of formaldehyde was 0.75. The bed of the resin was washed with distilled water and the column filled with water to the top level of the resin bed. Five cubic centimeters of an aqueous solution containing 10 percent by weight of acetone and 10 percent of formaldehyde was fed into the top of the column at a rate of 1 cc. of the aqueous solution per minute. The bed of resin was eluted with distilled water fed thereto at the same rate. The effluent solution was collected as successive fractions. Each fraction was tested to determine its index of refraction. Table VIII identifies each fraction as being stated portions of the effluent liquor and gives the index of refraction of each.

Table VIII

| Fraction No. | cc. of Effluent Liquor in Fraction | $n_D^{35}$ |
|---|---|---|
| 1 | 0-48 | 1.3312 |
| 2 | 48-50 | 1.3315 |
| 3 | 50-52 | 1.3319 |
| 4 | 52-54 | 1.3328 |
| 5 | 54-56 | 1.3340 |
| 6 | 56-58 | 1.3342 |
| 7 | 58-60 | 1.3340 |
| 8 | 60-62 | 1.3338 |
| 9 | 62-64 | 1.3332 |
| 10 | 64-68 | 1.3330 |
| 11 | 68-70 | 1.3335 |
| 12 | 70-72 | 1.3339 |
| 13 | 72-74 | 1.3340 |
| 14 | 74-76 | 1.3341 |
| 15 | 76-78 | 1.3348 |
| 16 | 78-80 | 1.3350 |
| 17 | 80-82 | 1.3348 |
| 18 | 82-84 | 1.3331 |
| 19 | 84-86 | 1.3330 |
| 20 | 86-88 | 1.3324 |
| 21 | 88-90 | 1.3319 |
| 22 | 90-92 | 1.3315 |
| 23 | 92-94 | 1.3313 |
| 24 | 94-100 | 1.3312 |

The first of the above fractions was water. Fractions Nos. 2-8 were rich in acetone with little if any formaldehyde. Fractions Nos. 9-13 contained a mixture of small amounts of both solutes. Fractions Nos. 14-22 were rich in formaldehyde. Fractions Nos. 23-24 were water.

EXAMPLE 9

A granular cation exchange resin composed of a sulfonated copolymer of approximately 87 percent by weight of styrene, 5 percent of ethylvinylbenzene and 8 percent of divinylbenzene, as described in Example 1, was placed in a glass tube approximately 0.5 inch in diameter to form a bed of the resin 20 inches deep. The resin was in its sodium form. The K value determined for an aqueous solution containing 5 percent by weight of phenol employing the cation exchange resin in its sodium form was 5.26. The K value for a 5 percent aqueous solution of methyl alcohol was 0.73. The tube was filled with distilled water to the top level of the resin bed. Thereafter 5 cc. of an aqueous solution containing 7 percent by weight of methyl alcohol and 7 percent by weight of phenol was fed to the tube with resultant displacement, from the tube of an equal volume of water. Water was slowly added to the tube at a rate of approximately 1 cc. of the water per minute to flush the liquor and the adsorbed material from the bed of the resin. The effluent liquor was collected as successive fractions, and its index of refraction determined. The index of refraction constitutes an indirect, but easily determined measure of the concentration of solute in the respective fractions. Table IX identifies the fractions as being stated portions of the effluent liquor and gives the index of refraction of each.

*Table IX*

| Fraction No. | cc. of Effluent Liquor in Fraction | $n_D^{35}$ |
|---|---|---|
| 1 | 0–60 | 1.3313 |
| 2 | 60–62 | 1.3315 |
| 3 | 62–64 | 1.3318 |
| 4 | 64–72 | 1.3320 |
| 5 | 72–76 | 1.3318 |
| 6 | 76–80 | 1.3315 |
| 7 | 80–200 | 1.3313 |
| 8 | 200–205 | 1.3314 |
| 9 | 205–210 | 1.3315 |
| 10 | 210–220 | 1.3316 |
| 11 | 220–225 | 1.3317 |
| 12 | 225–235 | 1.3318 |
| 13 | 235–240 | 1.3319 |
| 14 | 240–265 | 1.3320 |
| 15 | 265–285 | 1.3319 |
| 16 | 285–300 | 1.3318 |
| 17 | 300–310 | 1.3317 |
| 18 | 310–320 | 1.3316 |
| 19 | 320–330 | 1.3315 |
| 20 | 330–345 | 1.3314 |
| 21 | 345–360 | 1.3313 |

The first of the above fractions was water. Fractions Nos. 2–6 contained all of the methyl alcohol. Fraction No. 7 was water containing no solute. Fractions Nos. 7–20 contained all of the phenol. Fraction No. 21 was water.

EXAMPLE 10

A glass tube of approximately 0.5 inch internal diameter was filled with 100 cubic centimeters of a water-wet granular anion exchange resin to form a bed approximately 24 inches deep. The anion exchange resin was composed of the reaction product of trimethylamine and a chloromethylated copolymer of approximately 88.5 percent styrene, 4 percent ethylvinylbenzene and 7.5 percent divinylbenzene. The anion exchange resin in its dry form was composed of rounded granules of from 20 to 50 mesh per inch, Tyler screen. The K value determined for an aqueous solution containing 2 percent by weight of methylamine employing the anion exchange resin in its chloride form was 0.08. The K value for a 2 percent solution of butylamine was 0.98. The column was filled to the top level of the resin bed with distilled water. Ten milliliters of an aqueous solution containing 2 percent by weight of methylamine and 2 percent of normal butylamine was introduced into the column, with resultant displacement from the column of an equal volume of water. Water was slowly added to the tube to flush the liquor and the absorbed material from the resin. The effluent liquor was collected as successive fractions and each fraction was tested to determine its index of refraction. Table X identifies the fractions as being stated portions of the effluent liquor and gives the index of refraction of each.

*Table X*

| Fraction No. | cc. of Effluent Liquor in Fraction | $n_D^{35}$ |
|---|---|---|
| 1 | 0–40 | 1.3313 |
| 2 | 40–42 | 1.3316 |
| 3 | 42–44 | 1.3320 |
| 4 | 44–46 | 1.3325 |
| 5 | 46–48 | 1.3328 |
| 6 | 48–58 | 1.3330 |
| 7 | 58–60 | 1.3328 |
| 8 | 60–64 | 1.3327 |
| 9 | 64–68 | 1.3323 |
| 10 | 68–72 | 1.3320 |
| 11 | 72–76 | 1.3317 |
| 12 | 76–80 | 1.3314 |
| 13 | 80–84 | 1.3313 |
| 14 | 84–88 | 1.3316 |
| 15 | 88–92 | 1.3319 |
| 16 | 92–96 | 1.3321 |
| 17 | 96–104 | 1.3322 |
| 18 | 104–108 | 1.3321 |
| 19 | 108–112 | 1.3320 |
| 20 | 112–116 | 1.3319 |
| 21 | 116–120 | 1.3318 |
| 22 | 120–124 | 1.3317 |
| 23 | 124–128 | 1.3316 |
| 24 | 128–132 | 1.3315 |
| 25 | 132–140 | 1.3314 |
| 26 | 140–148 | 1.3313 |

The first of the above fractions was water. Fractions 2–11 contained nearly all of the methylamine. Fractions 12–13 were principally water containing a small amount of solute. Fractions 14–25 contained nearly all of the normal butylamine. Fraction 26 was water.

EXAMPLE 11

A purpose of this example is to illustrate the manner in which a determination of the distribution constant values for aqueous solutions of individual organic compounds provides a way of predetermining whether any two or more non-ionized or lowly ionized water-soluble organic compounds can be separated from one another by the invention.

The distribution constant or K value determined for an aqueous solution containing 5 percent by weight of glycerine, employing the cation exchange resin described in Example 1, was 0.47. The K value for an aqueous solution containing 5 percent by weight of methanol was 0.57. Five cubic centimeters of an aqueous solution containing 5 percent by weight of glycerine and 5 percent of methanol, was fed to the water-immersed bed of the cation exchange resin described in Example 1, with resultant displacement from the bed of an equal volume of water. After feeding the 5 cc. of the aqueous solution of the organic compounds to the bed of the resin, water was introduced at a rate of 1 cc. per minute to flush the liquor and the absorbed material from the bed of resin. The effluent liquor which was displaced by feed of the solution and subsequently of water to the bed, was collected as successive fractions. Each fraction was tested to determine its index of refraction. Table XI identifies the fractions as being stated portions of the effluent liquor and gives the index of refraction of each.

Table XI

| Fraction No. | cc. of Effluent Liquor in Fraction | $n_D^{35}$ |
| --- | --- | --- |
| 1 | 0–48 | 1.3313 |
| 2 | 48–50 | 1.3314 |
| 3 | 50–52 | 1.3316 |
| 4 | 52–54 | 1.3320 |
| 5 | 54–56 | 1.3328 |
| 6 | 56–58 | 1.3334 |
| 7 | 58–60 | 1.3339 |
| 8 | 60–62 | 1.3339 |
| 9 | 62–64 | 1.3334 |
| 10 | 64–66 | 1.3328 |
| 11 | 66–68 | 1.3320 |
| 12 | 68–70 | 1.3318 |
| 13 | 70–72 | 1.3318 |
| 14 | 72–74 | 1.3319 |
| 15 | 74–76 | 1.3319 |
| 16 | 76–78 | 1.3320 |
| 17 | 78–80 | 1.3319 |
| 18 | 80–81.5 | 1.3318 |
| 19 | 81.5–83.3 | 1.3317 |
| 20 | 83.3–85.2 | 1.3315 |
| 21 | 85.2–87 | 1.3314 |
| 22 | 87–89 | 1.3314 |
| 23 | 89–91 | 1.3313 |
| 24 | 91–93 | 1.3313 |

The first of the above fractions was water. Fractions Nos. 2–11 contained approximately 95 percent of the glycerine. Fractions Nos 12–13 were water containing small amounts of both glycerine and methanol. Fractions Nos. 14–22 contained nearly all of the methanol. Fractions Nos. 23–24 were water.

For purpose of comparison, the distribution constant values were determined for aqueous solutions containing, respectively, 5 percent by weight of acetic acid and 5 percent of triethylene glycol employing the cation exchange resin in its hydrogen form described in Example 1. The K value determined for acetic acid was 0.68. The K value determined for triethylene glycol was 0.71. Five cubic centimeters of an aqueous solution containing 5 percent by weight of acetic acid and 5 percent of triethylene glycol were fed to the bed of the water-immersed cation exchange resin described in Example 1. After feeding the 5 cc. of the aqueous solution of the organic compounds to the bed of the resin, water was introduced at a rate of 1 cc. per minute to flush the liquor and the absorbed materials from the bed. The effluent liquor which was displaced by feed of the solution and subsequently of water to the bed, was collected as successive fractions. Each fraction was tested to determine its index of refraction. Table XII identifies the fractions as being stated portions of the effluent liquor and gives the index of refraction of each.

Table XII

| Fraction No. | cc. of Effluent Liquor in Fraction | $n_D^{35}$ |
| --- | --- | --- |
| 1 | 0–54.5 | 1.3313 |
| 2 | 54.5–56.6 | 1.3316 |
| 3 | 56.6–58.6 | 1.3320 |
| 4 | 58.6–60.6 | 1.3327 |
| 5 | 60.6–62.6 | 1.3332 |
| 6 | 62.6–64.5 | 1.3338 |
| 7 | 64.5–66.3 | 1.3341 |
| 8 | 66.3–68.2 | 1.3340 |
| 9 | 68.2–70.1 | 1.3339 |
| 10 | 70.1–72 | 1.3339 |
| 11 | 72–74 | 1.3333 |
| 12 | 74–75.9 | 1.3330 |
| 13 | 75.9–79.9 | 1.3323 |
| 14 | 79.9–81.9 | 1.3320 |
| 15 | 81.9–83.9 | 1.3318 |
| 16 | 83.9–85.9 | 1.3316 |
| 17 | 85.9–88 | 1.3315 |
| 18 | 88–90 | 1.3314 |
| 19 | 90–92 | 1.3313 |
| 20 | 92–94 | 1.3313 |

The first of the above fractions was water. Fractions 2–18 contained all of the acetic acid and the triethylene glycol. Fractions 19–20 were water. No substantial separation of the organic compounds from one another was obtained.

I claim:

1. A method for separating from one another a mixture of at least two water-soluble organic compounds each having an ionization constant not exceeding $1.4 \times 10^{-3}$ and capable of being absorbed by an ion exchange resin and subsequently washed from the resin with water, which method comprises, feeding to a water-immersed bed of an ion exchange resin an aqueous solution of at least two such organic solutes which are non-reactive with said ion exchange resin and which solutes are selectively absorbed by said resin in amounts differing from one another by an amount corresponding to at least 0.1 between the distribution constant values determined for aqueous solutions containing, respectively, from 2 to 5 percent by weight of the individual organic compounds, thus displacing from the bed of resin an equal volume of water, then feeding water to the bed to displace a further amount of liquid from the bed and elute the absorbed organic compounds from the resin, and collecting successive fractions of the displaced effluent liquid, whereby there is obtained a fraction of the effluent liquid which contains a major proportion of the least readily absorbed organic compound and subsequent fractions each containing a major proportion of an organic compound that is more readily absorbed by the resin than the previously eluted organic solute.

2. A method wherein the steps described in claim 1 are repeated using a further amount of the starting solution and the same bed of ion exchange resin.

3. A method as described in claim 1, wherein the ion exchange resin is a cation exchange resin having an acidic form which is ionized to an extent such that the addition of a 10 gram portion thereof to 100 cubic centimeters of a 0.1 normal aqueous sodium chloride solution brings the latter to a pH value of less than 3.

4. A method as described in claim 1, wherein the ion exchange resin is an anion exchange resin having a basic form which is ionized to an extent such that the addition of a 10 gram portion thereof to 100 cubic centimeters of a 0.1 normal aqueous sodium chloride solution brings the latter to a pH value greater than 11.

5. A method as described in claim 1, wherein the ion exchange resin is a cation exchange resin which contains sulfonate radicals as the functional groups of the same.

6. A method as described in claim 1 wherein the ion exchange resin is a nuclear sulfonated copolymer of a major proportion of at least one polymerizable monoalkenyl aromatic hydrocarbon and a minor amount of divinylbenzene.

7. A method as described in claim 1, wherein the ion exchange resin is an anion exchange resin which contains quaternary ammonium radicals as the functional groups of the same.

8. A method as described in claim 1, wherein the ion exchange resin is the reaction product of a nuclear halomethylated copolymer of a major proportion of at least one monovinyl aromatic hydrocarbon with a minor amount of divinylbenzene and a tertiary amine.

9. A method as described in claim 1, wherein the ion exchange resin is the reaction product of a nuclear halomethylated copolymer of a major proportion of styrene and minor amounts of ar-ethylvinylbenzene and divinylbenzene and an alkylene polyamine.

10. A method as described in claim 1, wherein the ion exchange resin is a cation exchange resin which contains carboxylic acid groups as the functional groups of the same.

(References on following page)

References Cited in the file of this patent

UNITED STATES PATENTS

| | | |
|---|---|---|
| 2,462,597 | Block | Feb. 22, 1949 |
| 2,528,188 | Taylor | Oct. 31, 1950 |
| 2,566,353 | Mills | Sept. 4, 1951 |
| 2,684,331 | Bauman | July 20, 1954 |

OTHER REFERENCES

Myers et al.: Ind. and Eng. Chem., vol. 33, No. 10, October 1941, pages 1271, 1274 and 1275.

Williams et al.: "Chromatography," Chem. Engineering, November 1948, page 135.

Chem. and Eng. News, vol. 30, September 29, 1952.